UNITED STATES PATENT OFFICE.

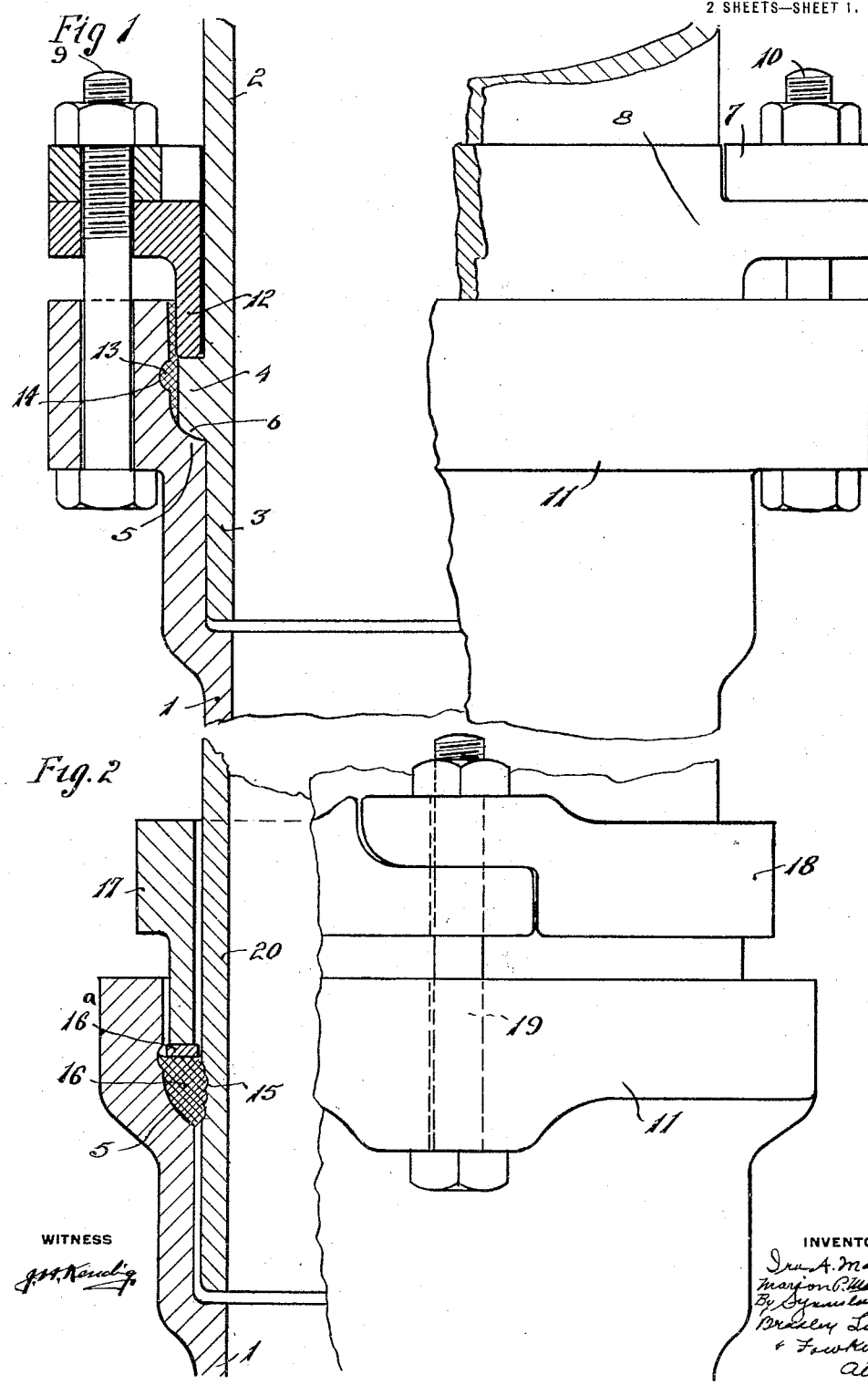

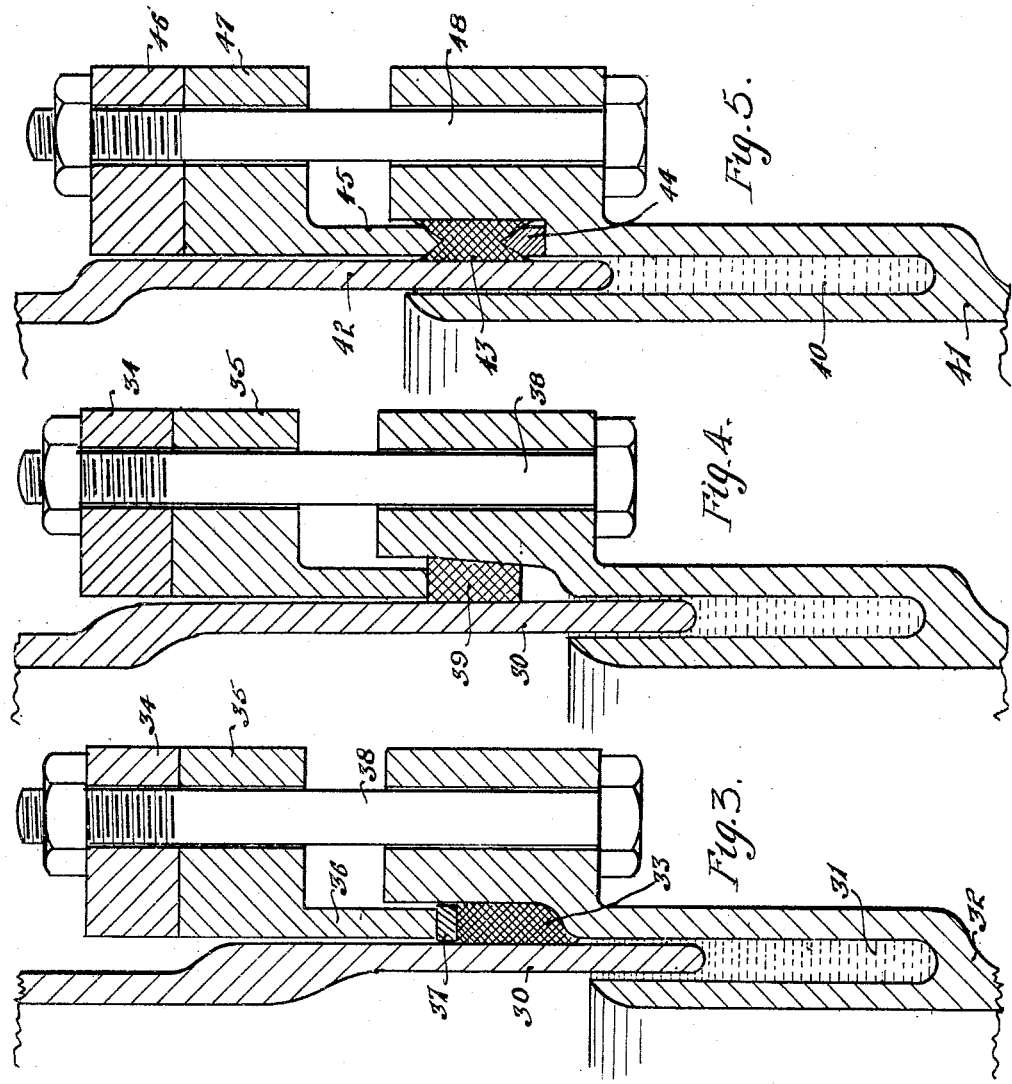

IRA A. MANN, DECEASED, LATE OF PITTSBURGH, PENNSYLVANIA, BY MARION P. MANN, EXECUTRIX, OF PITTSBURGH, PENNSYLVANIA.

PIPE CONSTRUCTION.

1,309,145.  Specification of Letters Patent.  Patented July 8, 1919.

Application filed December 21, 1917. Serial No. 208,309.

*To all whom it may concern:*

Be it known that IRA A. MANN, late a citizen of the United States, residing at Pittsburgh, in the county of Allegheny and State of Pennsylvania, invented certain new and useful Improvements in Pipe Constructions, of which the following is a specification.

The invention relates to pipe constructions, and particularly to the connecting means at the joints. It has for its principal objects; the provision of a construction wherein, (1) the joint may be made very secure against leakage, (2) the strain upon the packing means incident to a tendency of the pipe to sag or buckle is reduced, (3) the pipe which fits into the hub may be used without a special end or with an end which can be prepared at the point of installation, so that the pipe may be cut to irregular lengths and used as conditions require, and (4) a tight joint may be maintained regardless of changes in length incident to temperature conditions. Certain embodiments of the invention are illustrated in the accompanying drawings, wherein—

Figure 1 is a partial side elevation of a pipe joint embodying the invention; Fig. 2 is a similar view showing the pipe construction where it has been necessary to use a pipe of irregular length and so cut off the regular end; and Figs. 3, 4 and 5 are partial sections showing modifications.

Referring to the constructions of Figs. 1 and 2, 1 is the hub of a pipe having a recess of two diameters into which projects the pipe end 2, the lower portion 3 of such pipe end fitting the part of the hub recess of least diameter, while the enlargement 4 fits the portion of the hub of greater diameter. A shoulder 5 is provided between the portions of the hub of differing diamter, and such shoulder has a curved ground surface adapted to engage a similar surface 6 on the enlargement 4. The term "ground surface" is used in its broad sense to indicate a surface which is smoothed, either by grinding or some other process, so as to make a tight joint.

Above the enlargement 4 on the pipe end 2 is a ring or collar made in two parts 7 and 8 hinged together upon the bolts 9 and 10, so that the collar may be removed. The bolts 9 and 10 extend through perforations in a flange 11 carried by the hub and the tightening of these bolts brings the ground surfaces into tight engagement, as the halves 7 and 8 of the collar are provided with downwardly projecting flanges 12 engaging the enlargements 4.

In order to add greater security to the joint a metallic packing 13 is employed above the ground surfaces, such packing being retained in the hub recess by means of the groove 14. The pipe end 3 fitting into the portion of the hub recess of smaller diamter reinforces the joint against lateral bending, thus reducing the tendency of the pipe to sag or buckle.

When the pipe has to be cut to a special length the extreme end carrying the enlargement 4 is of course cut off and some other means must be employed for securing a tight joint. The means preferably employed is illustrated in Fig. 2, wherein the hub 1 is precisely the same as in the other construction and has the ground surface at the shoulder 5. The pipe end is preferably grooved, as indicated at 15, which groove can be placed in the pipe when the pipe is cut to the required length. A metallic packing 16 is employed, such metallic packing engaging the shoulder 5 and also fitting into the groove 15. This packing is held in place by a ring $16^a$ clamped down upon the packing by a collar corresponding to that of Fig. 1 and comprising the parts 17 and 18. The collar is moved down by means of bolts 19 extending through the collar and through the flange 11 as in Fig. 1.

The annular strip of metal 16 which may be of iron or any desired metal, distributes the pressure from the collar upon the packing and prevents the packing from working out. The hub 1 and pipe end 20 fitting therein are also held against relative longitudinal movement by the packing, which holding effect is improved by reason of the groove 15 into which the packing is pressed.

Fig. 3 illustrates a modification in which the pipe end 30 fits into a recess 31 in the hub 32, which recess constitutes a water seal. A metallic packing 33 is provided in the hub recess and such packing is held tightly in position by means of the two-part collar 34, 35, whose flanges 36 engage an annular strip 37 above the packing. The bolts 38 serve to clamp the collar down into position and apply the necessary pressure to the packing 33.

The water seal serves to maintain the passage of any gas and this water seal is replenished each time a flow of liquid occurs through the pipe.

Fig. 4 illustrates another modification wherein the parts are precisely the same as in the construction of Fig. 4, and are so numbered with the exception of the packing 39, which in this instance may be a brass or composition ring which is forced down into position with sufficient force to make a tight joint with the hub and pipe end.

Fig. 5 illustrates still another modification wherein a water seal 40 is provided in the hub 41 into which the pipe end 42 projects. A brass or composition ring 43 serves as a packing and is provided with V-shaped grooves at its upper and lower edges. The lower groove is engaged by the member 44, preferably a ring of relatively hard metal, while the upper groove is engaged by the V-shaped ends of the flanges 45 which flanges form a part of the two-part collar members 46 and 47. The collar members are clamped down into position by the bolts 48 and the V-shaped members engaging the grooves in the ring 43 serve to spread such ring and insure a tight engagement between its side surfaces and the inner surfaces of the pipe and hub.

The lead packing above the ground joints in the various modifications serves to give additional security to the joint, but in most cases the ground joint is sufficient and it is only necessary to add the lead packing in case the joint springs a leak.

What is claimed is:

In a pipe connection, the combination of a hub having an upper recess and a lower recess of relatively smaller diameter, a pipe end disposed within said recesses and having a lesser diameter than that of the lower and smaller recess, whereby to provide a slight clearance between the outer face of the extreme end of the pipe and the confronting face of said lower recess, the base of said upper recess being inclined downwardly and laterally toward said clearance and being dimensionally greater than said clearance, a packing in said upper recess having the greater part of its basal portion supported on said inclined base, and follower means carried by said hub having a gland disposed in the upper part of the upper recess to engage the packing and coöperating with said inclined base to force the unsupported and lesser basal portion of the packing into the clearance.

MARION P. MANN,
*Executrix of Ira A. Mann, deceased.*

Copies of this patent may be obtained for five cents each, by addressing the "Commissioner of Patents, Washington, D. C."